(12) United States Patent
Becker et al.

(10) Patent No.: US 11,204,059 B2
(45) Date of Patent: Dec. 21, 2021

(54) REMOVABLE SLEEVE FOR HOLDING AND FIXING SCREWS

(71) Applicant: SOGEFI AIR & COOLING, Guyancourt (FR)

(72) Inventors: Nicolas Becker, Porte du Ried (FR); Benoît Ancel, Eguisheim (FR)

(73) Assignee: SOGEFI AIR & COOLING, Guyancourt (FR)

( * ) Notice: Subject to any disclaimer, the term of this patent is extended or adjusted under 35 U.S.C. 154(b) by 246 days.

(21) Appl. No.: 16/493,180

(22) PCT Filed: Mar. 14, 2018

(86) PCT No.: PCT/FR2018/050608
§ 371 (c)(1),
(2) Date: Sep. 11, 2019

(87) PCT Pub. No.: WO2018/167427
PCT Pub. Date: Sep. 20, 2018

(65) Prior Publication Data
US 2020/0072274 A1    Mar. 5, 2020

(30) Foreign Application Priority Data

Mar. 16, 2017 (FR) ...................................... 17 52144

(51) Int. Cl.
*F16B 13/12* (2006.01)
*F16B 41/00* (2006.01)
*F16B 1/00* (2006.01)

(52) U.S. Cl.
CPC .... *F16B 41/002* (2013.01); *F16B 2001/0092* (2013.01)

(58) Field of Classification Search
CPC ....................... F16B 41/002; F16B 2001/0092
(Continued)

(56) References Cited

U.S. PATENT DOCUMENTS 2,590,175 A * 3/1952 Hajdu ..................... F16B 2/245
411/61
3,156,281 A    11/1964 Demi
(Continued)

FOREIGN PATENT DOCUMENTS

DE    298 04 041    7/1999
DE    10 2006 046262    4/2007

OTHER PUBLICATIONS

International Search Report dated May 23, 2018.

*Primary Examiner* — Gary W Estremsky
(74) *Attorney, Agent, or Firm* — Ipsilon USA, LLP

(57) ABSTRACT

The present invention concerns a removable sleeve (1) intended for being positioned on a fixing screw and produced from an elastically deformable material, characterised in that it has: a first cylindrical portion (5) with a constant internal diameter substantially equal to the external diameter of the shaft of said screw, this portion being extended by a second flared cylindrical portion (7) provided on the external peripheral surface of same with at least first and second axially separated rings of lugs (8, 9), an axial insertion slot (10) extending over the entire height of said sleeve (1) and wide enough to allow it to be mounted on the shaft of said screw and to be held there, at least one partial axial slot (11') extending over a portion of the height of said sleeve (1) from the flared end of same.

7 Claims, 7 Drawing Sheets

(58) Field of Classification Search
USPC .............................. 411/80.5, 512, 525, 526
See application file for complete search history.

(56) References Cited

U.S. PATENT DOCUMENTS

| | | | | |
|---|---|---|---|---|
| 3,186,281 | A * | 6/1965 | Wingen | B26D 5/04 83/469 |
| 3,561,075 | A * | 2/1971 | Selinko | F16B 41/002 24/704.1 |
| 4,222,310 | A * | 9/1980 | Garrett | F16D 65/18 92/128 |
| 6,116,837 | A * | 9/2000 | Suhle | F16B 21/088 411/508 |
| 6,769,851 | B2 * | 8/2004 | Agha | F16B 41/002 411/161 |
| 7,114,901 | B2 * | 10/2006 | Maruyama | F16B 5/0208 411/353 |
| 7,520,692 | B2 * | 4/2009 | Hsu | B62J 15/02 403/297 |
| 7,682,117 | B2 * | 3/2010 | Holt | F16B 5/0266 411/156 |
| 7,828,502 | B2 * | 11/2010 | Chretien | F16B 41/002 411/353 |
| 8,210,784 | B2 * | 7/2012 | Hartmann | F16B 41/002 411/353 |
| 8,672,595 | B2 * | 3/2014 | Goettlich | F16B 13/063 411/57.1 |
| 8,794,889 | B2 * | 8/2014 | Aukzemas | F16B 5/0266 411/353 |
| 2009/0110478 | A1 | 4/2009 | Schneider | |

* cited by examiner

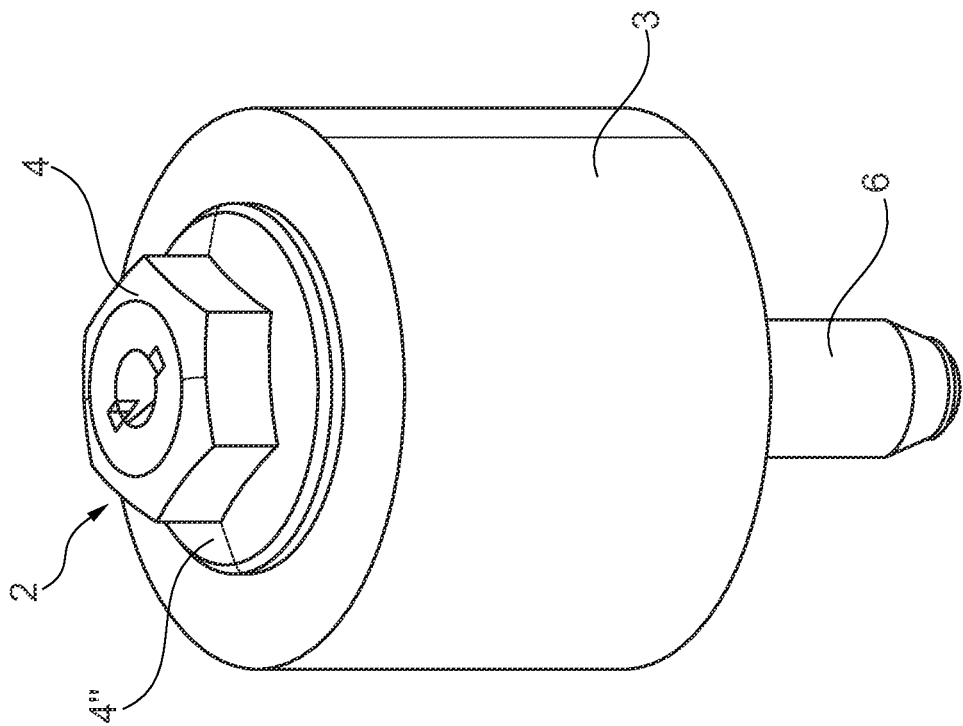
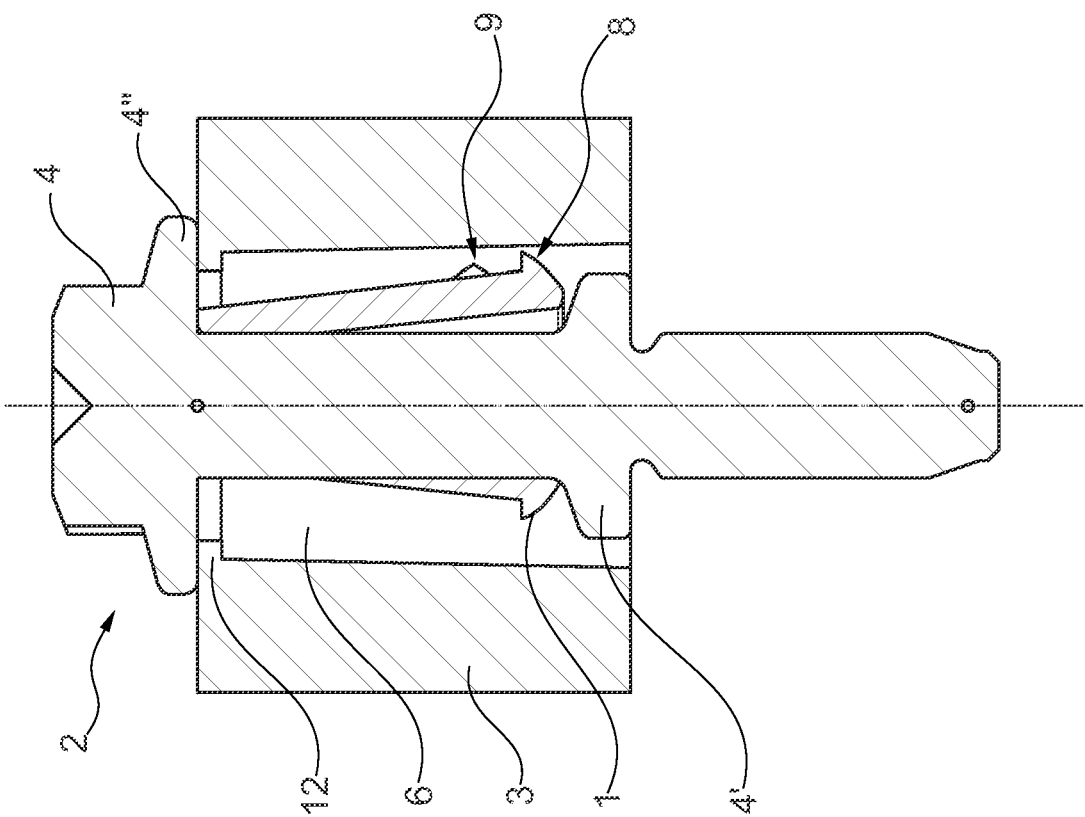

REMOVABLE SLEEVE FOR HOLDING AND FIXING SCREWS

RELATED APPLICATION

This application is a National Phase of PCT/FR2018/050608 filed on Mar. 14, 2018, which claims the benefit of priority from French Patent Application No. 17 52144, filed on Mar. 16, 2018, the entirety of which are incorporated by reference.

The invention lies in the field of mechanical engineering and more particularly that of the automotive industry, and even more particularly that of the screw-fastening of mechanical parts, typically the fastening of a distributor to a third-party component of the engine. Such a screw is generally pre-installed in an up position in the housing of the distributor and supplied to the customer in order to make handling operations easier for the operator.

DESCRIPTION OF RELATED ART

A screw for holding in an up position in a housing comprises, in a conventional and known manner, a two-part shank: close to the screw head, the shank is smooth and is then continued by a threaded part and a driving-in tip. The two parts are usually separated by a flange.

OBJECT AND SUMMARY

The object of the present invention is to allow the provision of a screw+hold assembly such that:
- the bottom end of the screw does not protrude, or at least protrudes very little, beyond the screw housing. Therefore, the screw has to be provisionally prevented from moving in axial translation in the dedicated housing of the distributor. This is notably important during the mounting of the distributor on the vehicle, which requires a movement in translation.
- the screw has to be aligned with the axis of the housing. Any inclination should be avoided in order to make mounting by the operator easier.
- the holding device for the screw must not cause damage to the screw pitch, the housing, etc.
- the holding device must not create soiling of the chip type during screwing.
- the holding device must be robust and adaptable to any type of screw known as a standard screw in order that screw modification is not necessary.

The document U.S. Pat. No. 8,057,122 B2 discloses an assembly unit, in which a screw can be held in its housing with the aid of a rigid sheath of cylindrical shape. This sheath is fastened to the shank of the screw by a cross-sectional narrowing and does not allow precise adjustment and holding or perfectly vertical positioning or the taking up of clearances in particular on account of its rigidity and its constant circular cross section.

The aim of the present invention is to remedy at least some of these drawbacks and to provide at least some of the abovementioned advantages.

Thus, an aim thereof is a device for holding the screw in an up position, which is formed by a sleeve made of plastics material that cooperates with an annular edge formed on the screw housing, in particular in the abovementioned distributor.

In accordance with the present invention, the removable sleeve intended to be positioned on a fastening screw in order to hold the latter in position, before the final mounting thereof, above its housing in a body, notably a distributor, is made of an elastically deformable material and is characterized in that it has:
- on the side of the head of the screw, a first cylindrical portion of constant inside diameter that is substantially equal to the outside diameter of the shank of said screw at this level, this first portion being extended toward the other, free end of said screw by a second cylindrical portion with an outwardly flared or frustoconical shape that is provided on its outer peripheral surface with at least one first and second ring of axially spaced-apart lugs,
- an axial insertion slot that extends over the entire height of said sleeve and is sufficiently wide to allow the sleeve to be mounted radially on the shank of said screw and to be held there,
- at least one partial axial slot that extends over a portion of the height of said sleeve from the flared free end thereof.

Further features will be described in more detail in the following description.

BRIEF DESCRIPTION OF THE DRAWINGS

The invention will be understood better from the following description, which refers to a preferred embodiment that is given by way of nonlimiting example and explained with reference to the appended schematic drawings, in which:

FIGS. 3a to 3f show 3D views or views in cross section of the assembly from FIG. 2 and the various steps in the method of joining it to a distributor serving as a housing.

DETAILED DESCRIPTION

Figure 1A:
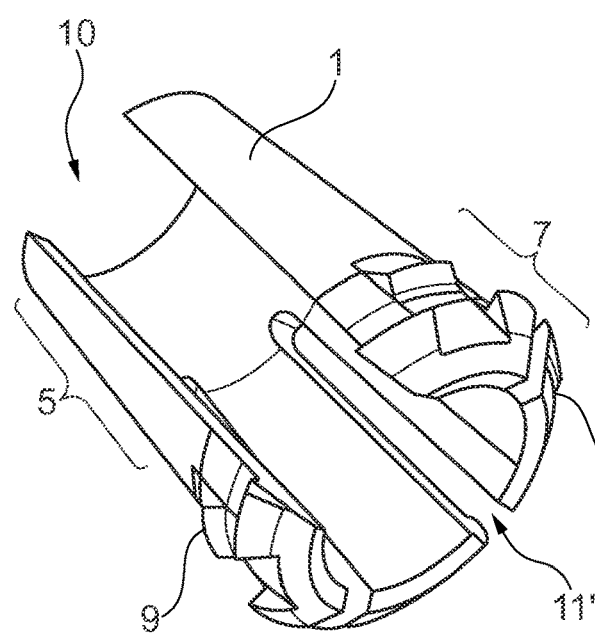
FIGS. 1a, 1b and 1c show three 3D views of the sleeve according to the invention from three different points of view.

As can be seen from FIG. 1, the sleeve 1 according to the invention is a removable sleeve 1 intended to be positioned on a fastening screw 2 in order to hold the latter in position, before the final mounting thereof, above its housing 3 in a body, notably a distributor (cf. for example FIG. 3a), said sleeve 1 being made of an elastically deformable material and characterized in that it has:
- on the side of the head 4 of the screw 2, a first cylindrical portion 5 of constant inside diameter that is substantially equal to the outside diameter of the shank 6 of said screw 2 at this level, this first portion being extended toward the other, free end of said screw 2 by a second cylindrical portion 7 with an outwardly flared or frustoconical shape that is provided on its outer peripheral surface with at least one first and second ring of axially spaced-apart lugs 8, 9,
- an axial insertion slot 10 that extends over the entire height of said sleeve 1 and is sufficiently wide to allow the sleeve 1 to be mounted radially on the shank 6 of said screw 2 and to be held there,
- at least one partial axial slot 11 that extends over a portion of the height of said sleeve 1 from the flared free end thereof.

Preferably, the sleeve 1 according to the invention is made of a plastics material, for example of PA6, PA66, PA6 GF15, PP, etc.

Figure 1B:
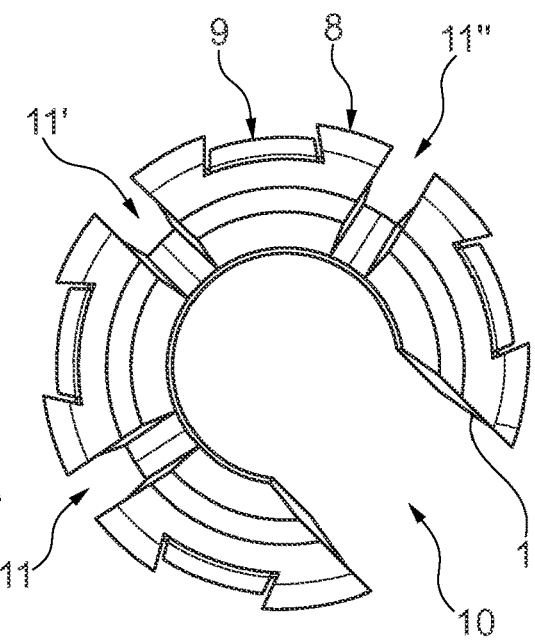
Figure 1C:
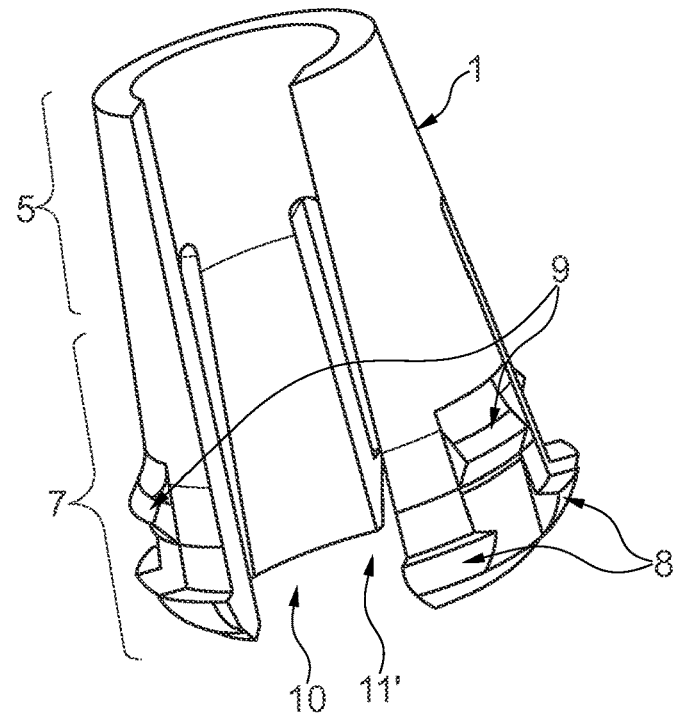

As can be seen particularly clearly in FIG. 1b, the sleeve 1 according to the invention is advantageously characterized in that it has at least two, preferably three partial axial slots 11, 11', 11". The latter ensure a good compromise between flexibility and resistance to crushing and make it possible to ensure good operation of the screw 2+sleeve 1 assembly during mounting.

The sleeve 1 according to the invention is also characterized in that the partial axial slot(s) 11, 11', 11" extend(s) substantially as far as the first cylindrical portion 5. This preserves a degree of rigidity at this upper level and the presence of enough material for good contact and good guidance of the shank 6 of the screw 2.

Advantageously, the sleeve 1 according to the invention is characterized in that the partial axial slot(s) 11, 11', 11" has/have a rounded end on their side that is not free. This is visible particularly clearly in FIGS. 1a and 1c. This shape allows in particular better distribution of the mechanical loads and stresses that are exerted on said sleeve 1 and contributes toward increasing the service life of the latter.

For practical and economic reasons, the sleeve 1 according to the invention is also characterized in that all the partial axial slots 11, 11', 11" have an identical shape and size. The production of said sleeves 1 by molding is simplified thereby.

According to a particularly advantageous embodiment, the sleeve 1 according to the invention is characterized in that the first and second rings of lugs 8, 9 are formed by protruding lugs that are distributed uniformly around the outer periphery of said sleeve 1, the two rings being offset such that the lugs of one of the two rings do not overlap the lugs of the other. This is schematically illustrated for example in the abovementioned FIGS. 1a to 1c.

In particular, the sleeve 1 according to the invention is characterized in that a first ring of lugs 8 is situated at the free, flared end of said sleeve 1, the lugs being realized so as to form an axial retaining stop or a sort of axial retaining stop that cooperates with an annular lip 12 of the housing 3 of the screw 2, making it possible, as a result of the elastic deformation of the material, to introduce the sleeve 1 and the screw 2 into said housing 3 and to prevent unintentional removal (at least) of said sleeve 1.

Moreover, the sleeve 1 according to the invention is also characterized in that a second ring of lugs 9 is situated higher up than the first ring of lugs 8, the lugs of said second ring 9 being realized so as to rest on an upper surface of the housing 3 in order to keep the sleeve 1 and the screw 2 in position outside said housing 3 before they are finally mounted in order to fasten the body to a third-party component of the engine.

Preferably, the lugs have a beveled shape or the shape of an annular portion with a triangular base pointing toward the outside of the sleeve 1 which will be in contact with the housing 3. It is also possible to use a succession of such portions with a triangular cross section that extend at different angles so as to form an outwardly protruding stepped ramp for the lugs of the second ring of lugs 9. For the lugs of the first ring of lugs 8 which is situated at the bottom, flared and free end of the sleeve 1, lugs that have a downwardly rounded shape will be preferred, as shown for example in FIG. 2. This shape which resembles, in front view, an arm of an anchor will make it easier to introduce the sleeve 1 into the housing 3 through the annular lip 12 (cf. FIG. 3b). Of course, other geometries or geometric combinations are also possible.

Figure 2:
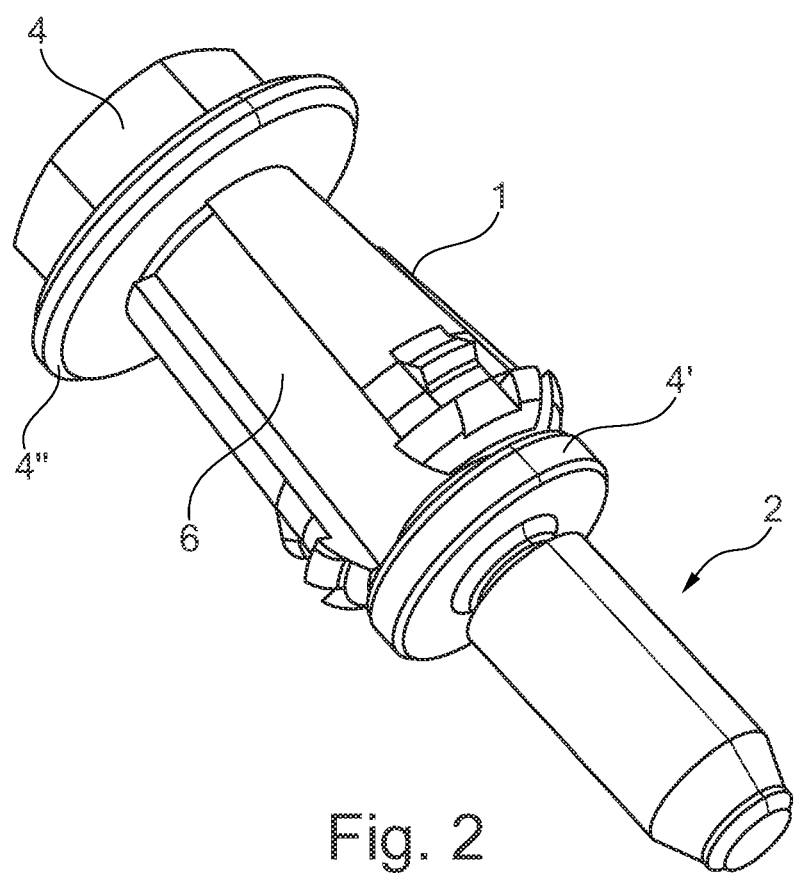
FIG. 2 shows the sleeve according to the invention mounted on an example of a screw.

By virtue of its axial insertion slot 10 which extends over the entire height along the axial axis of the sleeve 1, the latter can be mounted easily, precisely and entirely safely on the shank 6 of the screw 2, a conventional example of which is illustrated notably in FIG. 2 with the sleeve 1 clip-fastened thereto and held thereon. The sleeve 1 is dimensioned so as to extend between the screw head 4 and the flange 4' of the screw 2. At the head 4 of the screw 2, the cylindrical and circular upper lip of the sleeve 1 comes into contact with the head disk 4" on which it rests. The shank 6 of the screw is completely surrounded and in contact with the sleeve 1 at this level as long as the diameter of the circular section remains constant in the first cylindrical portion 5. On the other side, the sleeve 1 stops just above the flange 4' of the screw 4 with its first ring of lugs 8. This is notably visible in FIG. 3b.

Referring now more particularly to FIGS. 3a to 3f, the way in which the sleeve 1 according to the invention works will be explained in a schematic and simplified manner.

Figure 3A:
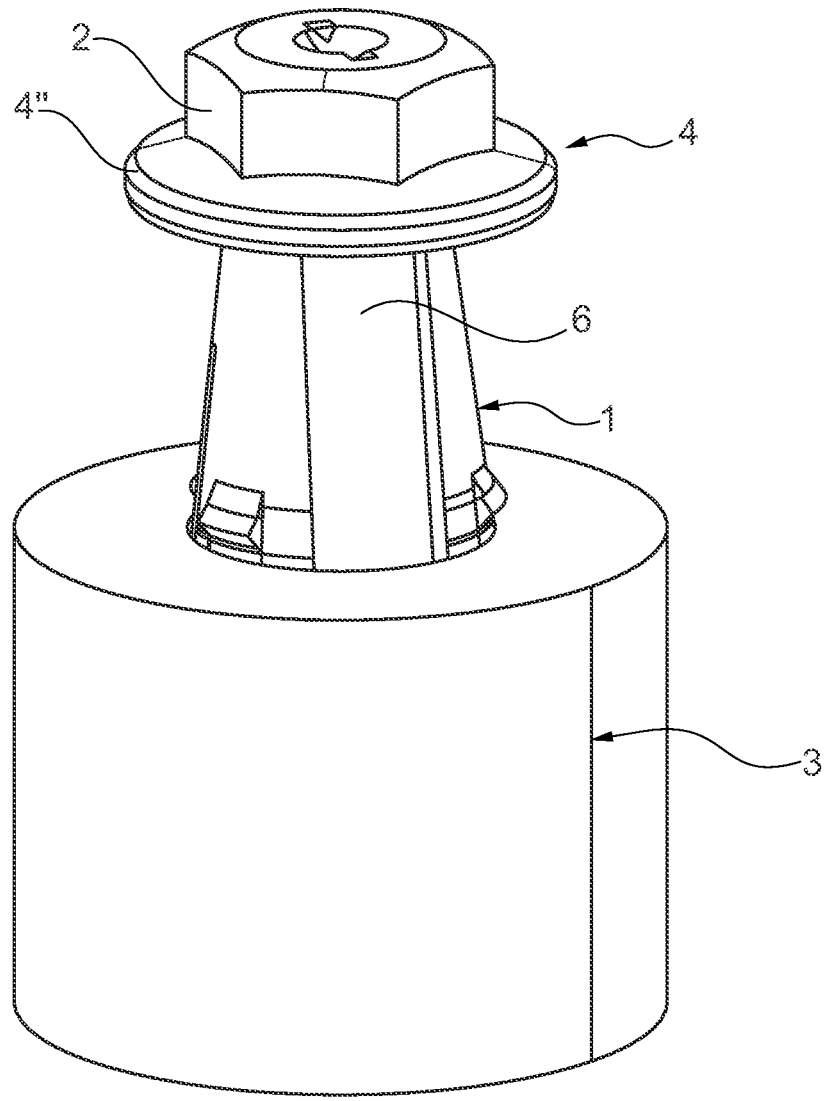

FIG. 3a shows the screw 2 and sleeve 1 assembly in the up position on the housing component 3 before said screw is inserted during the actual mounting operation. Said screw 2 is held properly in a perfectly vertical position so as to be prevented from moving in axial translation by the two abovementioned rings of lugs 8 and 9. Preferably, this part of the shank 6 of the screw 2 is not threaded.

Figure 3B:
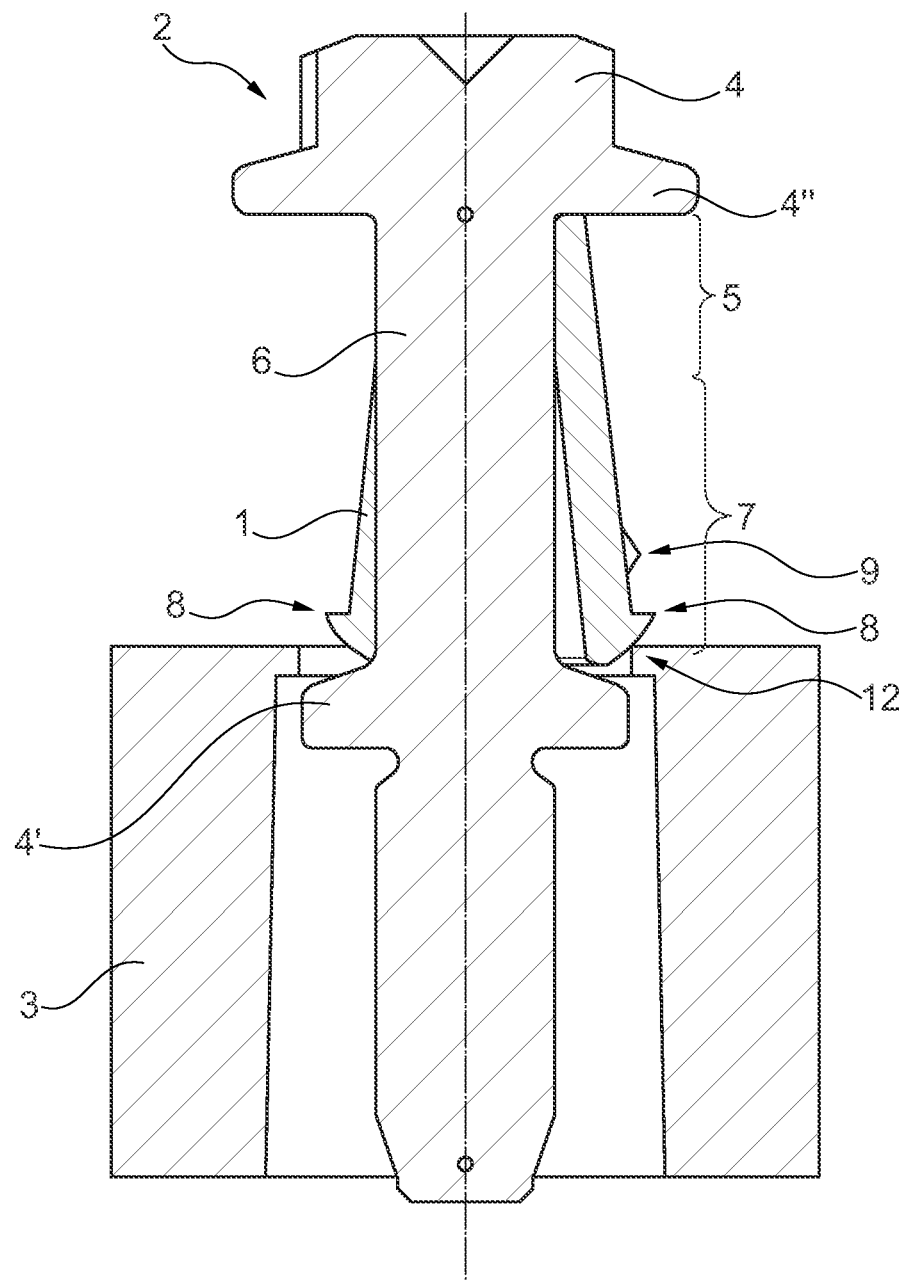
Figure 3C:
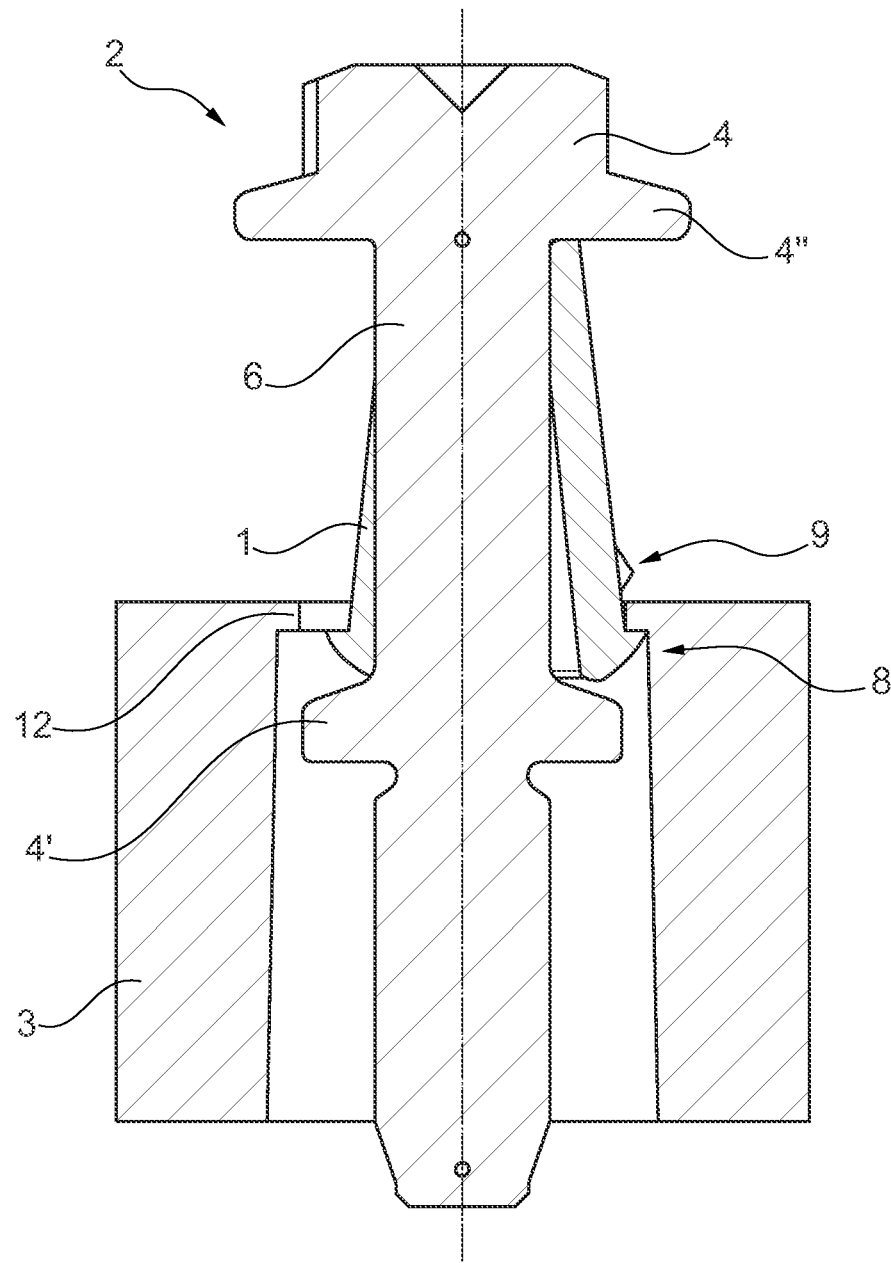

FIG. 3b shows the screw 1 before it is introduced into the housing 3. By virtue of the geometry and the flexible nature of the material of the sleeve 1, the lower lateral tabs slide over the annular lip 12 and retract so as to allow the assembly to be introduced into said housing 3. FIG. 3c shows a cross section of the position of FIG. 3a mentioned above.

Figure 3D:
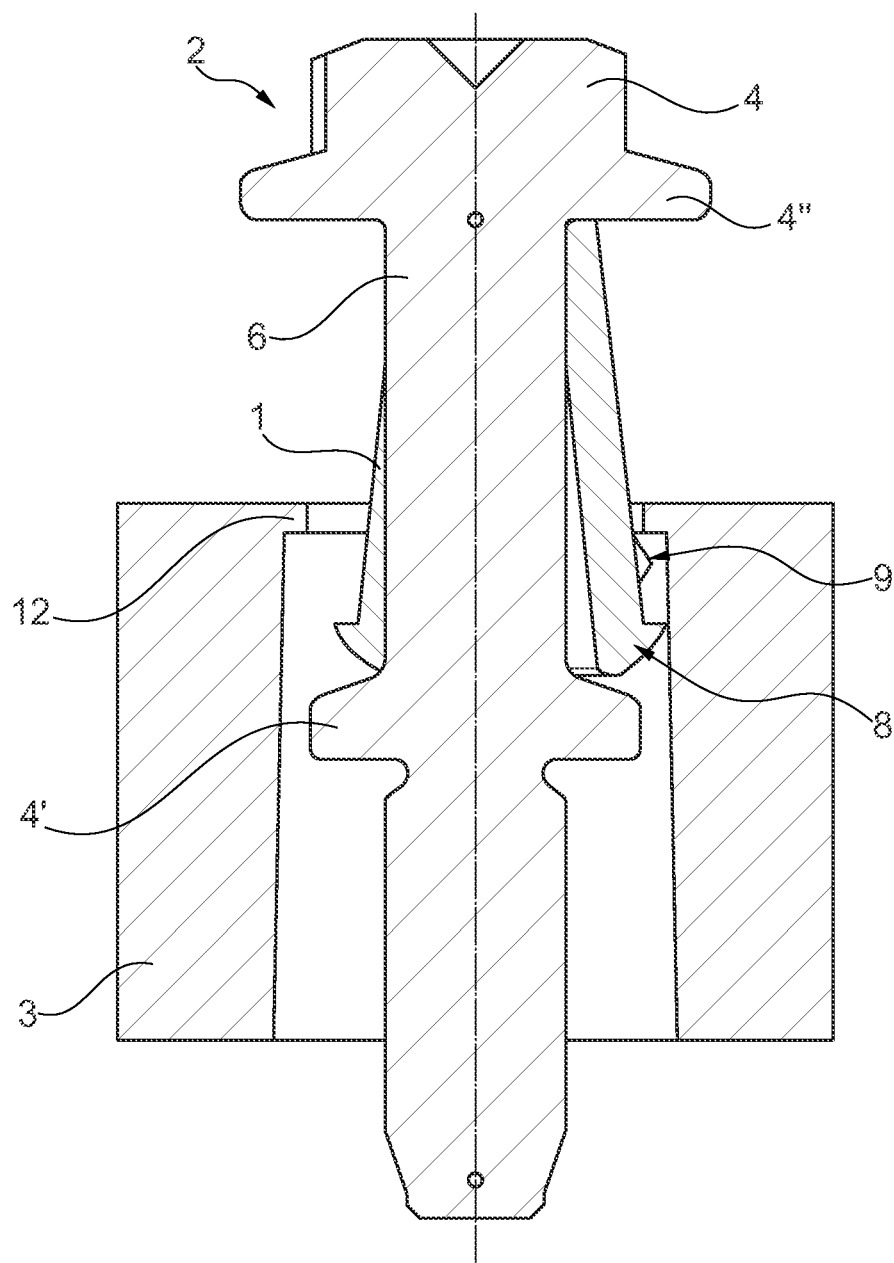

By continuing the insertion effort, the second ring of lugs 9 likewise passes the annular lip 12 as suggested in FIG. 3d. The screw continues to be introduced until the head ring 4" comes into contact with the abovementioned annular lip 12 (FIG. 3e and FIG. 3f).

In other words, the conical shape of the sleeve 1 defines a free space between the shank 6 and the sleeve 1 at the flexible tabs, while the ring of the cylindrical portion 5 is adjusted in terms of diameter about said shank 6, at the opposite end from the flexible tabs.

The sleeve 1 and the screw 2 are inserted by a movement in translation and the clearance defined between the tabs and the shank 6 allows the introduction of the lugs 8, 9 with the flange by the flexible tabs retracting inward. The tabs return to their position once they have passed the annular lip 12.

The sleeve 1 according to the invention therefore advantageously has the following features:

- by virtue of its axial insertion slot 10, it has the shape of a longitudinally slotted ring, allowing simple installation around the smooth part of the shank 6 of the screw 2.
- this ring comprises two parts: a first part of cylindrical geometry, close to the head 4 of the screw 2, and a second part of conical geometry. The first cylindrical portion or section 5 ensures the vertical alignment of the screw 2 in the receiving housing 3 of the distributor, while the second cylindrical portion or section 7 of conical geometry or shape serves to fasten the sleeve 1 to the distributor.
- several partial axial slots 11, 11', 11" are distributed around the circumference of the conical ring section. These slots form openings over approximately 20%, at least, of the height of the sleeve 1, the latter defining tabs, preferably at least two tabs having a degree of flexibility.
- each tab is provided with a lug that is positioned at the free end of the tab and faces outward; such that the diameter of the sleeve 1 measured at these lugs is substantially greater than the diameter of the housing 3 in the distributor measured at its annular lip 12.

a second ring of lugs 9 is present at a distance from the first ring of lugs 8, thereby defining an annular groove between the two rings of lugs.

The lugs of the first and second rings 8, 9 advantageously have beveled surfaces, which will make it easier to introduce/withdraw said lugs with the annular lip 12 formed in the housing 3 of the distributor.

The specific shape of the lugs of the first ring 8 (with a beveled surface) makes it easier for the lugs to pass beyond the annular lip 12 of the housing 3 of the distributor.

The annular lip 12 formed on the body, for example the distributor, is thus received in the groove formed between the two rings of lugs 8, 9, thereby preventing any axial movement of the sleeve 1 and of the screw 2.

The second ring of lugs 9 also has an inclined surface (chamfer) on the surface facing the annular lip 12. This makes it easier to insert the sleeve 1 and the screw 2 into the housing 3 of the distributor during screwing in order to fasten the distributor.

Advantageously, the lugs of the second ring 9 have a second surface inclined away from the surface facing the annular lip 12.

During the manufacture of the distributor, leak tests are carried out, requiring the screws 2 to be screwed to a support and the complete insertion of the sleeve 1 into its housing 3. Prior to delivery to the end user, it is thus necessary to reposition the screws 2 in the up position. This operation is facilitated by the shape of the lugs of the second ring 9.

Of course, the invention is not limited to the embodiment described and shown in the appended drawings. Modifications remain possible, in particular from the point of view of the make-up of the various elements or by substitution of equivalent techniques, without otherwise departing from the scope of protection of the invention defined by the claims.

The invention claimed is:

1. A removable sleeve positioned on a fastening screw in order to hold the latter in position, before final mounting thereof, above its housing in a body said sleeve being made of an elastically deformable material, wherein said removable sleeve has:

on a side of the head of the screw, a first portion of constant inside diameter that is substantially equal to an outside diameter of a shank of said screw at this level, this first portion being extended toward an other, free end of said screw by a second portion with an outwardly flared or frustoconical shape that is provided on its outer peripheral surface, with at least one first and second ring of axially spaced-apart lugs, an axial insertion slot that extends over the entire height of said sleeve and is sufficiently wide to allow the sleeve to be mounted radially on the shank of said screw and to be held there, at least one partial axial slot that extends over a portion of the height of said sleeve from the flared free end thereof, wherein the partial axial slot(s) extend(s) substantially as far as the first portion.

2. The sleeve as claimed in claim 1, wherein said sleeve has at least two, preferably three partial axial slots.

3. The sleeve as claimed in claim 1, wherein the partial axial slot(s) has/have a rounded end on their side that is not free.

4. The sleeve as claimed in claim 2, wherein said partial axial slots have an identical shape and size.

5. The sleeve as claimed in claim 1, wherein said at least one first and second ring of axially spaced apart lugs, are formed by protruding lugs that are distributed uniformly around the outer periphery of said sleeve, the two rings being offset such that the lugs of one of the two rings do not overlap the lugs of the other.

6. The sleeve as claimed in claim 1, wherein a first ring of lugs is situated at the free, flared end of said sleeve, the lugs being realized so as to form an axial retaining stop that cooperates with an annular lip of the housing of the screw, making it possible, as a result of the elastic deformation of the material, to introduce the sleeve and the screw into said housing and to prevent unintentional removal of said sleeve.

7. The sleeve as claimed in claim 6, wherein a second ring of lugs is situated higher up than the first ring of lugs, the lugs of said second ring being realized so as to rest on an upper surface of the housing in order to keep the sleeve and the screw in position outside said housing before they are mounted.

* * * * *